United States Patent [19]

Grubb, III

[11] Patent Number: 4,867,684

[45] Date of Patent: Sep. 19, 1989

[54] ORGANIZER-KEYBOARD

[76] Inventor: John T. Grubb, III, 6408 Ave. "O", Santa Fe, Tex.

[21] Appl. No.: 314,491

[22] Filed: Feb. 23, 1989

Related U.S. Application Data

[63] Continuation of Ser. No. 104,833, Oct. 5, 1987, abandoned.

[51] Int. Cl.⁴ ............................................. G09B 11/10
[52] U.S. Cl. ...................................... 434/84; 434/231
[58] Field of Search ................. 434/84, 103, 202, 227, 434/231, 232

[56] References Cited

U.S. PATENT DOCUMENTS

| | | | |
|---|---|---|---|
| 925,716 | 6/1909 | McAnulty | 434/202 X |
| 940,093 | 11/1909 | Vick | 434/232 |
| 2,624,126 | 1/1953 | Bolognino et al. | 434/202 |
| 2,987,827 | 6/1961 | Carnegie, Sr. | 434/202 |

FOREIGN PATENT DOCUMENTS 496943 8/1954 Italy ................................... 434/232

Primary Examiner—Ira S. Lazarus
Assistant Examiner—Peggy A. Neils
Attorney, Agent, or Firm—Robert W. B. Dickerson

[57] ABSTRACT

A structure for selectively displaying markers, or crayons, such selectivity being controlled by a keyboard whereby a user, on depressing an activator, may cause the selected marker to be elevated.

1 Claim, 3 Drawing Sheets

FIG. 1-A

ORGANIZER-KEYBOARD

This is a continuation, of application serial no. 07/104,833, filed Oct. 5, 1987 now abandoned.

BACKGROUND OF THE INVENTION

One significant area of a child's education involves the development of artistic skills, including color recognition. Commencing at a pre-school age, young persons are exposed to coloring books. Perhaps the most universal medium used by a child is the common crayon. Along with the benefit goes the detriment. Organizational skills normally develop more slowly, and sometimes, according to some parents, not at all. Therefore it has long been highly desirable for there to be a structure permitting a centralized location for coloring equipment, rather than scattered to all sorts of undesirable locations.

Coupled with the aforementioned problem, a recent area of intellectual activity has quickly spread to ever more youthful users, ie, the area of computer technology. Second only to the fascination with video images is an intrique with the manner of manipulating such image, ie, with a keyboard.

This invention is directed toward both a) permitting the organization, in a useful manner, of a child's coloring equipment, and b) providing such a child with an early exposure to a keyboard.

SUMMARY OF THE INVENTION

A basic housing includes a plurality of horizontal shelves and/or vertical racks, for receiving paraphernalia such as crayons, paints, brushes, paper, coloring books, etc. Additionally, both a lower level and a higher level display board include an equal number of rows of apertures therethrough. The upper level apertures may have hollow tubes secured to the I.D. thereof, and extending therethrough. Curved plunger movably connects each lower level aperture with a counterpart tube associated with an upper level aperture. A marker, or crayon for example, would be positioned in each tube. An actuator positioned at the lower level end of each plunger permits a user to depress the same, thereby elevating its other end, and thereby urging its associated marker upward to a display position.

DESCRIPTION OF THE DRAWINGS

FIG. 1-A is a side elevation of the door;

DESCRIPTION OF A PREFERRED EMBODIMENT

Figure 1:
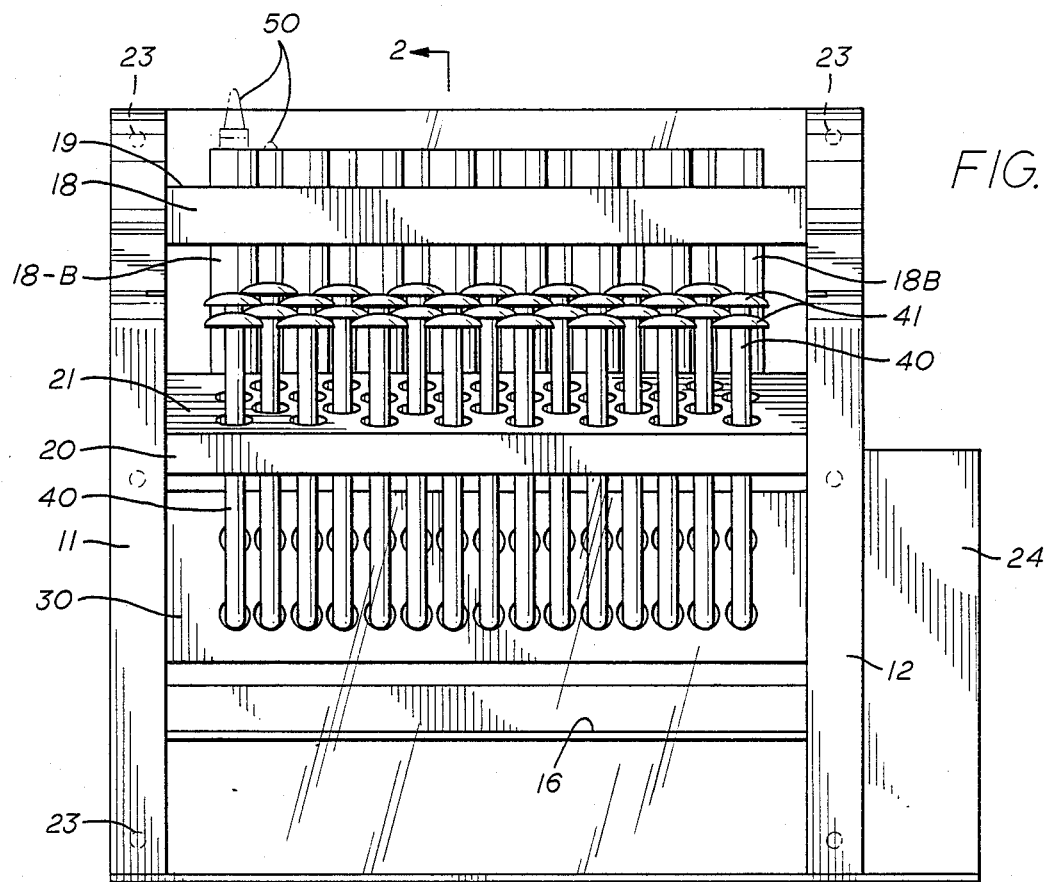
FIG. 1 is a front elevation of the invention.
Figure 2:
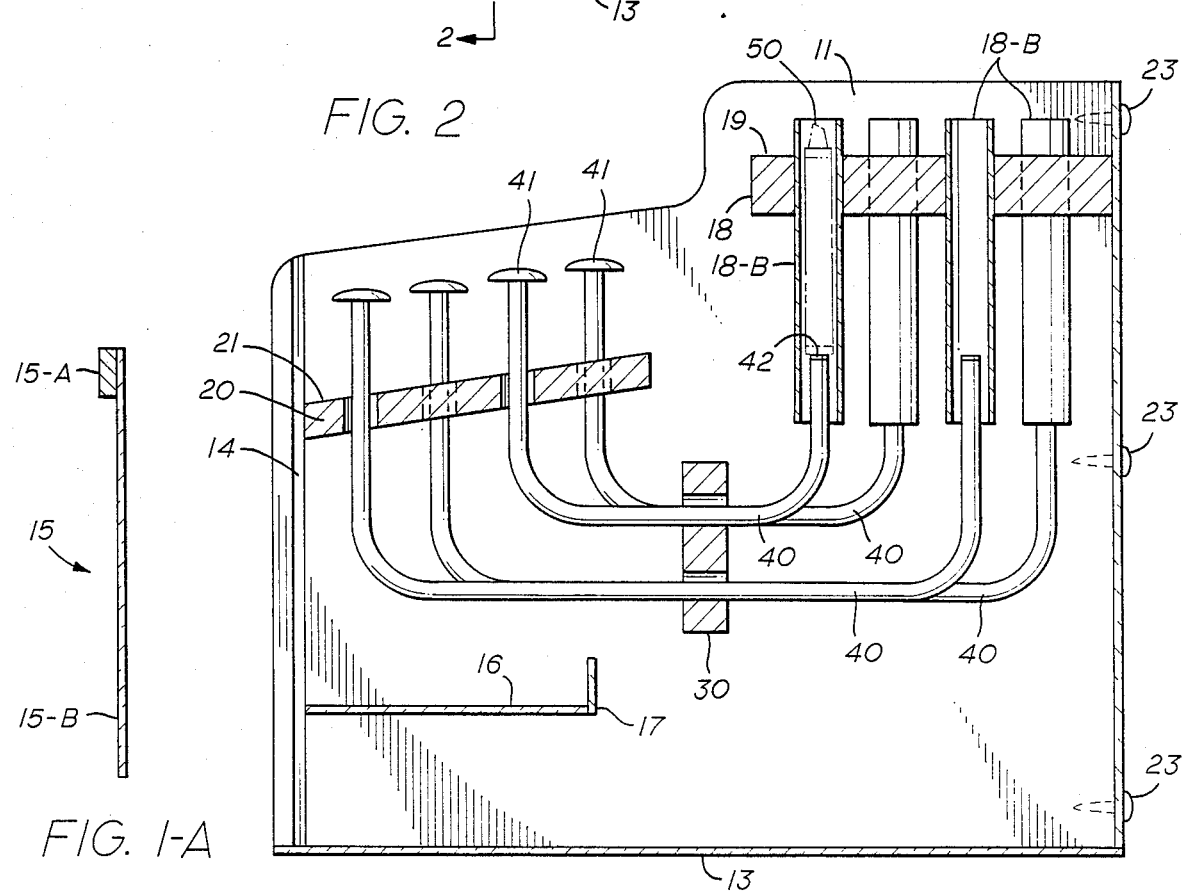
FIG. 2 is a vertical section, taken along lines 2-2 of FIG. 1.
Figure 3:
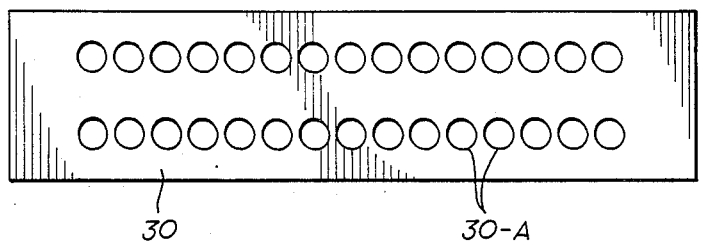
FIG. 3 is a front elevation of the guide board.
Figure 4:
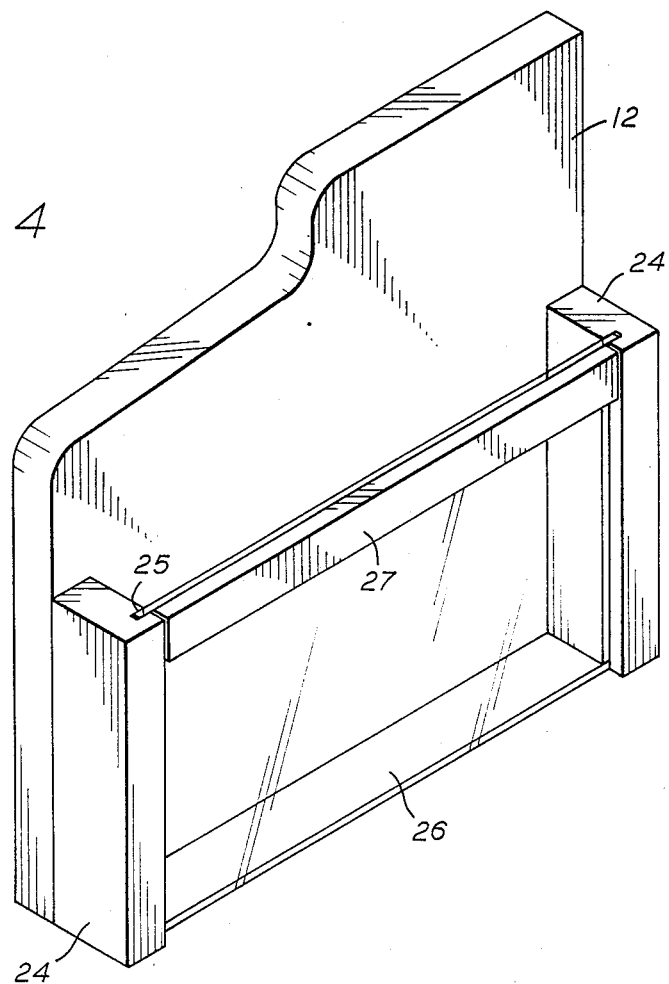
FIG. 4 is a perspective of one of the side walls with attached rack.

FIGS. 1 and 2 generally depict the organizer-keyboard which comprises this invention. The housing thereof includes vertical side walls 11 and 12. Bottom or floor 13 extends between said walls, and would be secured thereto in any convenient manner. The side walls each includes a vertical slot 14, to slidingly accommodate a door 15. Said door (see FIG. 1-A) includes a horizontally extended brace 15-A secured to transparent panel 15-B. A removable shelf 16 may be slidably positioned between side walls 11, 12 by virtue of horizontal slots not shown in each of said walls. A further, somewhat thicker, upper display board, or marker storage tray, 18 may also extend between said side walls, and be positioned within horizontal slots carried by each such side wall. Additionally, a lower display board, or keyboard 20 is positioned between side walls 11, 12, such as within slots carried by such walls.

A rear wall may be secured to each of side walls 11, 12, as by screws 23. A side storage rack is secured to side wall 12, and includes spaced side supports 24, each having a vertically extended slot 25. Said slots slidably receive door panel 26. Attached to the top of panel 26 is combination cross-brace and activating handle 27.

Also secured at its vertical edges to side walls 11, 12, is guide wall 30.

Each of display board 18, keyboard 20, and guide wall 30, includes a plurality of apertures, or passageways therethrough, as exemplified by numerals 18-A, 20-A, and 30-A, respectively. As illustrated, all such boards or walls carry the same number of apertures therethrough, although the guide wall could reduce in number, but enlarge in size, its passageways. A hollow tube, or cylinder, 18-B extends through each upper display board aperture, and is secured to the I.D. thereof. It is seen that substantially more of each such tube extends below display board 18 than above.

A series of curved plungers 40, each extends from above board 20, downwardly through one of its apertures 20-A, curving so as to pass through a passageway 30-A through guide wall 30, and upwardly partially through one of tubes 18-B, each of which tubes extend through an aperture 18-A of display board 18. Each plunger includes an actuator portion 41 at one end. The other plunger end 42 terminates within the confines of one of tubes 18-B.

Figure 5:
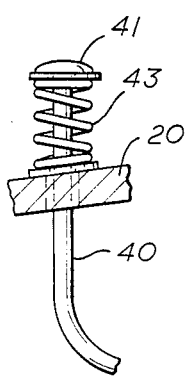
FIG. 5 is a detail of a modified actuator.
Figure 6:
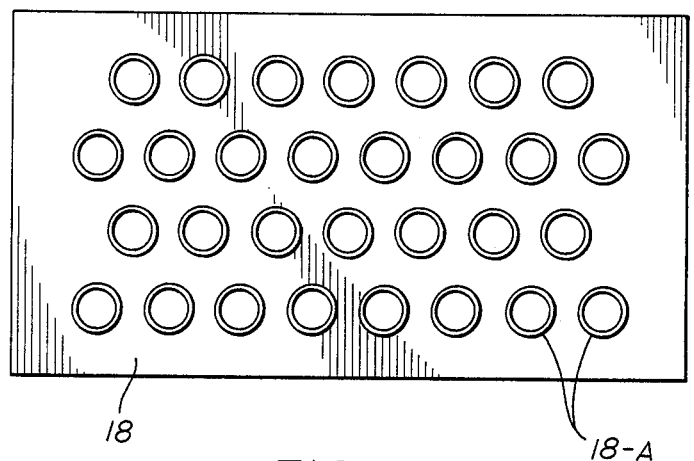
FIG. 6 and 7 are top elevations of the marker storage tray and the keyboard, respectively.
Figure 7:
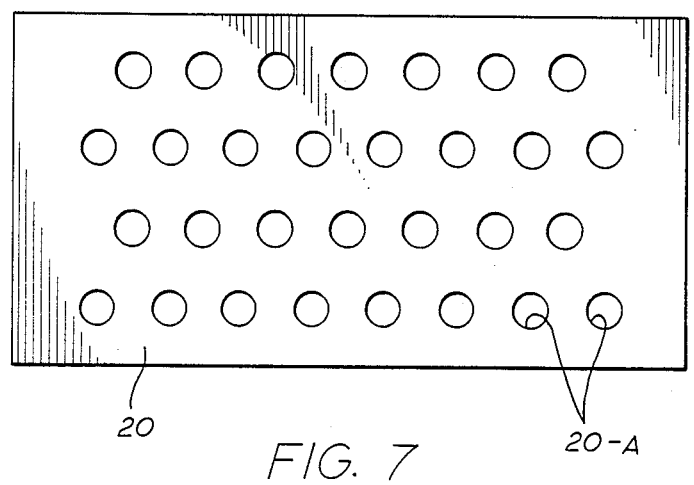

In operation, a marker, or crayon 50 would be inserted within each of tubes 18-B, resting atop end 42 of plunger 40, the marker roughly occupying the right hand phantom line position of FIG. 1. On a user depressing the actuator portion 41 of plunger 40, end 42 would be caused to rise within tube 18-B, elevating the marker contained therein to occupy the left hand phantom line position of FIG. 1. It will be seen that the lower I.D. of the apertures 30-A through guide wall 30, act as pivots for plungers 40. If desired, as shown in FIG. 5, a spring 43 may encircle plunger 40, and be seated between its actuator 41 and board 20. This would bias each such plunger 40 toward the crayon-recessed position.

A youthful user would be exposed to a finger actuated keyboard. He also would view the fruits of his effort, a predecessor experience to later use with a word processor or computer. Further, it will be noticed that the arrangement of apertures 18-A and 20-A is similar. This tends to develop a sense of logic in a user, in that a marker rises at the same relative location as is the depressed actuator.

Although only single embodiment has been described it should be obvious that numerous modifications would be possible by one skilled in the art without departing from the spirit of the invention, the scope of which is limited only by the following claims.

What is claimed is:

1. An organizer - keyboard which includes the following: housing means comprising:
spaced end walls;
keyboard means including a plurality of plunger actuators, each linked to one of a plurality of plungers, said keyboard means being secured to said walls;
object-display means, secured to said walls, including a like plurality of open-ended, parallel-oriented, object-receiving tubes, each said object-receiving tube receiving one of said plungers within one end thereof and adapted to have one of a plurality of objects movably received within its other end; and
said plurality of plungers each including first and second ends, said first end being secured to one of said plunger actuators and the other end being movably inserted within said one end of one of said object receiving tubes.

* * * * *